(12) United States Patent
Puri et al.

(10) Patent No.: US 10,956,296 B2
(45) Date of Patent: Mar. 23, 2021

(54) EVENT CORRELATION

(71) Applicant: Accenture Global Services Limited, Dublin (IE)

(72) Inventors: Colin Puri, San Jose, CA (US); Scott Kurth, San Francisco, CA (US); Srinivas Yelisetty, Fremont, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 494 days.

(21) Appl. No.: 15/609,848

(22) Filed: May 31, 2017

(65) Prior Publication Data
US 2017/0262353 A1 Sep. 14, 2017

Related U.S. Application Data

(63) Continuation of application No. 14/203,036, filed on Mar. 10, 2014, now Pat. No. 9,697,100.

(51) Int. Cl.
| | | |
|---|---|---|
| G06F 16/2458 | (2019.01) | |
| G06F 11/34 | (2006.01) | |
| G06F 11/07 | (2006.01) | |
| G06F 11/30 | (2006.01) | |
| G06F 16/93 | (2019.01) | |
| G06F 16/17 | (2019.01) | |

(52) U.S. Cl.
CPC ........ *G06F 11/3476* (2013.01); *G06F 11/079* (2013.01); *G06F 11/0751* (2013.01); *G06F 11/3072* (2013.01); *G06F 11/3089* (2013.01); *G06F 16/2477* (2019.01); *G06F 11/3452* (2013.01); *G06F 16/1734* (2019.01); *G06F 16/93* (2019.01); *G06F 2201/86* (2013.01)

(58) Field of Classification Search
CPC .................. G06F 16/2477; G06F 16/1734
See application file for complete search history.

(56) References Cited

U.S. PATENT DOCUMENTS

| | | | |
|---|---|---|---|
| 7,516,209 B2 | 4/2009 | Raghuraman | |
| 8,607,353 B2 | 12/2013 | Rippert | |
| 9,257,150 B2 | 2/2016 | Hurst | |
| 9,317,582 B2 | 4/2016 | Baum | |
| 2003/0074440 A1* | 4/2003 | Grabarnik | H04L 41/0631 709/224 |

(Continued)

OTHER PUBLICATIONS

Yue et al., "A Similarity Measure Based on Species Proportions", 2005, University of Wisconsin. (Year: 2005).*

(Continued)

*Primary Examiner* — Sheryl L Holland
(74) *Attorney, Agent, or Firm* — Mannava & Kang, P.C.

(57) ABSTRACT

Event correlation may include identifying a feature set for each log file of a plurality of log files, and extracting the feature set for each event of a plurality of events in each log file of the plurality of log files. Event correlation may further include determining a plurality of trace event pairs linkage strength values for an event from a first log file of the plurality of log files and a plurality of events from a second log file of the plurality of log files. The trace event pairs linkage strength values may represent an overlap of the feature set for the event from the first log file and the feature set for each of the plurality of events from the second log file.

20 Claims, 15 Drawing Sheets

(56) References Cited

U.S. PATENT DOCUMENTS

| | | | |
|---|---|---|---|
| 2003/0188189 A1* | 10/2003 | Desai | H04L 63/104 |
| | | | 726/23 |
| 2006/0208870 A1 | 9/2006 | Dousson | |
| 2007/0157315 A1* | 7/2007 | Moran | G06F 21/52 |
| | | | 726/23 |
| 2008/0126858 A1 | 5/2008 | Barras | |
| 2008/0137800 A1 | 6/2008 | Ohba et al. | |
| 2009/0019310 A1 | 1/2009 | Nastacio | |
| 2009/0070786 A1 | 3/2009 | Alves | |
| 2010/0223499 A1 | 9/2010 | Panigraphy | |
| 2011/0067008 A1 | 3/2011 | Srivastava | |
| 2012/0059683 A1 | 3/2012 | Opalach | |
| 2012/0131309 A1 | 5/2012 | Johnson | |
| 2013/0027561 A1 | 1/2013 | Lee et al. | |
| 2013/0073260 A1 | 3/2013 | Maeda | |
| 2013/0145350 A1* | 6/2013 | Marinescu | G06F 16/254 |
| | | | 717/128 |
| 2013/0159977 A1 | 6/2013 | Crosetto | |
| 2014/0283083 A1* | 9/2014 | Gula | H04L 63/1433 |
| | | | 726/25 |

OTHER PUBLICATIONS

Rahman et al., "Jaccard Index based Availability Prediction in Enterprise Grids", 2010, Elsevier. (Year: 2010).*

Williams et al., Scaling the Kernel Function to Improve Performance of the Support Vector Machine, 2005, Springer-Verlag. (Year: 2005).*

"The extended European search report", European Patent Application No. 15157279.9, European Patent Office, dated Aug. 28, 2015, 11 pages.

* cited by examiner

Sample event log of an Authentication Server

| Timestamp | Username | Target Server | User Location |
|---|---|---|---|
| 1 | Alice | S1 | 95113 |
| 2 | Bob | S1 | 95113 |
| 3 | Chuck | S1 | 95113 |
| 4 | Alice | S1 | 35119 |
| 5 | Chuck | S1 | 35119 |
| 6 | Chuck | S1 | 95113 |
| 7 | Bob | S2 | 95113 |
| 8 | Alice | S2 | 31159 |
| 9 | Bob | S2 | 31159 |
| 10 | Chuck | S2 | 31159 |

FIG. 2

Sample event log of a Network Monitoring System

| Timestamp | SessionID | Source | Destination Location |
|---|---|---|---|
| ... | ... | ... | ... |
| 6 | ABC | S4 | 12345 |
| 7 | XYZ | S1 | 95113 |
| 8 | DEF | S6 | 95113 |
| 9 | DEF | S2 | 54321 |
| 10 | ABC | S3 | 67890 |
| 11 | DEF | S5 | 35119 |
| 12 | XYZ | S2 | 31159 |
| 13 | XYZ | S1 | 12345 |
| 14 | ABC | S1 | 54321 |
| ... | ... | ... | ... |

FIG. 3

Traces Represented by Line Entry for Log File $\theta_1$

| Identifier | Timestamp | Event |
|---|---|---|
| 1 | 0 | A |
| 2 | 0 | B |
| 1 | 1 | A |
| 3 | 1 | C |
| 1 | 2 | B |
| 2 | 1 | C |

FIG. 4

Traces Represented by Line Entry for Log File $\theta_2$

| Identifier | Timestamp | Event |
|---|---|---|
| A | 0 | A1 |
| A | 1 | A2 |
| A | 3 | A3 |
| B | 0 | B1 |
| B | 2 | B2 |
| B | 3 | B3 |
| C | 0 | C1 |
| C | 1 | C2 |
| C | 2 | C3 |
| C | 3 | C4 |
| D | 0 | D1 |

FIG. 5

Trace Sequences From Log File $\theta_1$

| Identifier | Sequence (Event:Timestamp) |
|---|---|
| 1 | A:0, A:1, B:2 |
| 2 | B:0, C:1 |
| 3 | C:1 |

FIG. 6

Trace Sequences From Log File $\theta_2$

| Identifier | Sequence (Event:Timestamp) |
|---|---|
| A | A1:0, A2:1, A3:3 |
| B | B1:0, B2:2, B3:3 |
| C | C1:0, C2:1, C3:2, C4:3 |
| D | D1:0 |

FIG. 7

Feature Set for Events of Log File $\theta_1$

| $\gamma_{\varepsilon_{1,1,1}} = \{1, A\}$ | $\gamma_{\varepsilon_{1,2,1}} = \{2, B\}$ |
|---|---|
| $\gamma_{\varepsilon_{2,1,1}} = \{1, A\}$ | $\gamma_{\varepsilon_{2,2,1}} = \{2, C\}$ |
| $\gamma_{\varepsilon_{3,1,1}} = \{1, B\}$ | $\gamma_{\varepsilon_{1,3,1}} = \{3, C\}$ |

FIG. 10

Feature Set for Events of Log File $\theta_2$

| $\gamma_{\varepsilon_{1,1,2}} = \{A, A1\}$ | $\gamma_{\varepsilon_{1,3,2}} = \{C, C1\}$ |
|---|---|
| $\gamma_{\varepsilon_{2,1,2}} = \{A, A2\}$ | $\gamma_{\varepsilon_{2,3,2}} = \{C, C2\}$ |
| $\gamma_{\varepsilon_{3,1,2}} = \{A, A3\}$ | $\gamma_{\varepsilon_{3,3,2}} = \{C, C3\}$ |
| $\gamma_{\varepsilon_{1,2,2}} = \{B, B1\}$ | $\gamma_{\varepsilon_{4,3,2}} = \{C, C4\}$ |
| $\gamma_{\varepsilon_{2,2,2}} = \{B, B2\}$ | $\gamma_{\varepsilon_{1,4,2}} = \{D, D1\}$ |
| $\gamma_{\varepsilon_{3,2,2}} = \{B, B3\}$ | |

FIG. 11

| Trace Event Pairs Linkage Strength | Trace Event Pairs Linkage Strength |
|---|---|
| $\tau_{\gamma_{\varepsilon_{1,1,1}}\gamma_{\varepsilon_{1,1,2}}} = 1/3$ | $\tau_{\gamma_{\varepsilon_{1,2,1}}\gamma_{\varepsilon_{1,2,2}}} = 1/3$ |
| $\tau_{\gamma_{\varepsilon_{1,1,1}}\gamma_{\varepsilon_{2,1,2}}} = 1/3$ | $\tau_{\gamma_{\varepsilon_{1,2,1}}\gamma_{\varepsilon_{2,2,2}}} = 1/3$ |
| $\tau_{\gamma_{\varepsilon_{1,1,1}}\gamma_{\varepsilon_{3,1,2}}} = 1/3$ | $\tau_{\gamma_{\varepsilon_{1,2,1}}\gamma_{\varepsilon_{3,2,2}}} = 1/3$ |
|  |  |
| $\tau_{\gamma_{\varepsilon_{2,1,1}}\gamma_{\varepsilon_{1,1,2}}} = 1/3$ | $\tau_{\gamma_{\varepsilon_{2,2,1}}\gamma_{\varepsilon_{1,3,2}}} = 1/3$ |
| $\tau_{\gamma_{\varepsilon_{2,1,1}}\gamma_{\varepsilon_{2,1,2}}} = 1/3$ | $\tau_{\gamma_{\varepsilon_{2,2,1}}\gamma_{\varepsilon_{2,3,2}}} = 1/3$ |
| $\tau_{\gamma_{\varepsilon_{2,1,1}}\gamma_{\varepsilon_{3,1,2}}} = 1/3$ | $\tau_{\gamma_{\varepsilon_{2,2,1}}\gamma_{\varepsilon_{3,3,2}}} = 1/3$ |
|  | $\tau_{\gamma_{\varepsilon_{2,2,1}}\gamma_{\varepsilon_{4,3,2}}} = 1/3$ |
|  |  |
| $\tau_{\gamma_{\varepsilon_{3,1,1}}\gamma_{\varepsilon_{1,2,2}}} = 1/3$ | $\tau_{\gamma_{\varepsilon_{1,3,1}}\gamma_{\varepsilon_{1,3,2}}} = 1/3$ |
| $\tau_{\gamma_{\varepsilon_{3,1,1}}\gamma_{\varepsilon_{2,2,2}}} = 1/3$ | $\tau_{\gamma_{\varepsilon_{1,3,1}}\gamma_{\varepsilon_{2,3,2}}} = 1/3$ |
| $\tau_{\gamma_{\varepsilon_{3,1,1}}\gamma_{\varepsilon_{3,2,2}}} = 1/3$ | $\tau_{\gamma_{\varepsilon_{1,3,1}}\gamma_{\varepsilon_{3,3,2}}} = 1/3$ |
|  | $\tau_{\gamma_{\varepsilon_{1,3,1}}\gamma_{\varepsilon_{4,3,2}}} = 1/3$ |

FIG. 12

| Trace Event Pair | Time Difference | Trace Event Pair | Time Difference |
|---|---|---|---|
| $\gamma_{\varepsilon_{1,1,1}}\gamma_{\varepsilon_{1,1,2}}$ | 0 | $\gamma_{\varepsilon_{1,2,1}}\gamma_{\varepsilon_{1,2,2}}$ | 0 |
| $\gamma_{\varepsilon_{1,1,1}}\gamma_{\varepsilon_{2,1,2}}$ | 1 | $\gamma_{\varepsilon_{1,2,1}}\gamma_{\varepsilon_{2,2,2}}$ | 2 |
| $\gamma_{\varepsilon_{1,1,1}}\gamma_{\varepsilon_{3,1,2}}$ | 3 | $\gamma_{\varepsilon_{1,2,1}}\gamma_{\varepsilon_{3,2,2}}$ | 3 |

| Trace Event Pair | Time Difference | Trace Event Pair | Time Difference |
|---|---|---|---|
| $\gamma_{\varepsilon_{2,1,1}}\gamma_{\varepsilon_{1,1,2}}$ | 1 | $\gamma_{\varepsilon_{2,2,1}}\gamma_{\varepsilon_{1,3,2}}$ | 1 |
| $\gamma_{\varepsilon_{2,1,1}}\gamma_{\varepsilon_{2,1,2}}$ | 0 | $\gamma_{\varepsilon_{2,2,1}}\gamma_{\varepsilon_{2,3,2}}$ | 0 |
| $\gamma_{\varepsilon_{2,1,1}}\gamma_{\varepsilon_{3,1,2}}$ | 2 | $\gamma_{\varepsilon_{2,2,1}}\gamma_{\varepsilon_{3,3,2}}$ | 1 |
|  |  | $\gamma_{\varepsilon_{2,2,1}}\gamma_{\varepsilon_{4,3,2}}$ | 3 |

| Trace Event Pair | Time Difference | Trace Event Pair | Time Difference |
|---|---|---|---|
| $\gamma_{\varepsilon_{3,1,1}}\gamma_{\varepsilon_{1,2,2}}$ | 2 | $\gamma_{\varepsilon_{1,3,1}}\gamma_{\varepsilon_{1,3,2}}$ | 1 |
| $\gamma_{\varepsilon_{3,1,1}}\gamma_{\varepsilon_{2,2,2}}$ | 0 | $\gamma_{\varepsilon_{1,3,1}}\gamma_{\varepsilon_{2,3,2}}$ | 0 |
| $\gamma_{\varepsilon_{3,1,1}}\gamma_{\varepsilon_{3,2,2}}$ | 1 | $\gamma_{\varepsilon_{1,3,1}}\gamma_{\varepsilon_{3,3,2}}$ | 1 |
|  |  | $\gamma_{\varepsilon_{1,3,1}}\gamma_{\varepsilon_{4,3,2}}$ | 3 |

FIG. 13

| Trace Event Pair | Time Difference | Trace Event Pairs Link Time Strength | Trace Event Pair | Time Difference | Trace Event Pairs Link Time Strength |
|---|---|---|---|---|---|
| $\gamma_{\varepsilon_{1,1,1}}\gamma_{\varepsilon_{1,1,2}}$ | 0 | $\kappa = 0$ | $\gamma_{\varepsilon_{1,2,1}}\gamma_{\varepsilon_{1,2,2}}$ | 0 | $\kappa = 0$ |
| $\gamma_{\varepsilon_{1,1,1}}\gamma_{\varepsilon_{2,1,2}}$ | 1 | $\kappa = 1/3$ | $\gamma_{\varepsilon_{1,2,1}}\gamma_{\varepsilon_{2,2,2}}$ | 2 | $\kappa = 2/3$ |
| $\gamma_{\varepsilon_{1,1,1}}\gamma_{\varepsilon_{3,1,2}}$ | 3 | $\kappa = 3/3$ | $\gamma_{\varepsilon_{1,2,1}}\gamma_{\varepsilon_{3,2,2}}$ | 3 | $\kappa = 3/3$ |

| Trace Event Pair | Time Difference | Trace Event Pairs Link Time Strength | Trace Event Pair | Time Difference | Trace Event Pairs Link Time Strength |
|---|---|---|---|---|---|
| $\gamma_{\varepsilon_{2,1,1}}\gamma_{\varepsilon_{1,1,2}}$ | 1 | $\kappa = 1/2$ | $\gamma_{\varepsilon_{2,2,1}}\gamma_{\varepsilon_{1,3,2}}$ | 1 | $\kappa = 1/3$ |
| $\gamma_{\varepsilon_{2,1,1}}\gamma_{\varepsilon_{2,1,2}}$ | 0 | $\kappa = 0$ | $\gamma_{\varepsilon_{2,2,1}}\gamma_{\varepsilon_{2,3,2}}$ | 0 | $\kappa = 0$ |
| $\gamma_{\varepsilon_{2,1,1}}\gamma_{\varepsilon_{3,1,2}}$ | 2 | $\kappa = 2/2$ | $\gamma_{\varepsilon_{2,2,1}}\gamma_{\varepsilon_{3,3,2}}$ | 1 | $\kappa = 1/3$ |
|  |  |  | $\gamma_{\varepsilon_{2,2,1}}\gamma_{\varepsilon_{4,3,2}}$ | 3 | $\kappa = 3/3$ |

| Trace Event Pair | Time Difference | Trace Event Pairs Link Time Strength | Trace Event Pair | Time Difference | Trace Event Pairs Link Time Strength |
|---|---|---|---|---|---|
| $\gamma_{\varepsilon_{3,1,1}}\gamma_{\varepsilon_{1,2,2}}$ | 2 | $\kappa = 2/2$ | $\gamma_{\varepsilon_{1,3,1}}\gamma_{\varepsilon_{1,3,2}}$ | 1 | $\kappa = 1/3$ |
| $\gamma_{\varepsilon_{3,1,1}}\gamma_{\varepsilon_{2,2,2}}$ | 0 | $\kappa = 0$ | $\gamma_{\varepsilon_{1,3,1}}\gamma_{\varepsilon_{2,3,2}}$ | 0 | $\kappa = 0$ |
| $\gamma_{\varepsilon_{3,1,1}}\gamma_{\varepsilon_{3,2,2}}$ | 1 | $\kappa = 1/2$ | $\gamma_{\varepsilon_{1,3,1}}\gamma_{\varepsilon_{3,3,2}}$ | 1 | $\kappa = 1/3$ |
|  |  |  | $\gamma_{\varepsilon_{1,3,1}}\gamma_{\varepsilon_{4,3,2}}$ | 3 | $\kappa = 3/3$ |

FIG. 14

| Trace Event Pairs Linkage Strength | Time Difference | Trace Event Pairs Link Time Strength | Trace Event Pairs Link Score |
|---|---|---|---|
| $\tau_{\gamma_{\varepsilon_{1,1,1}}\gamma_{\varepsilon_{1,1,2}}} = 1/3$ | 0 | $\kappa = 0$ | $K = 1/3 \cdot (1-0) = 1/3$ |
| $\tau_{\gamma_{\varepsilon_{1,1,1}}\gamma_{\varepsilon_{2,1,2}}} = 1/3$ | 1 | $\kappa = 1/3$ | $K = 1/3 \, (1 - 1/3) = 2/9$ |
| $\tau_{\gamma_{\varepsilon_{1,1,1}}\gamma_{\varepsilon_{3,1,2}}} = 1/3$ | 3 | $\kappa = 3/3$ | $K = 1/3 \, (1 - 3/3) = 0$ |

FIG. 15

| Trace Event Pairs Linkage Strength | Time Difference | Trace Event Pairs Link Score | Trace Event Pairs Linkage Strength | Time Difference | Trace Event Pairs Link Score |
|---|---|---|---|---|---|
| $\tau_{\gamma_{\varepsilon_{1,1,1}}\gamma_{\varepsilon_{1,1,2}}} = 1/3$ | 0 | $K = 1/3$ | $\tau_{\gamma_{\varepsilon_{1,2,1}}\gamma_{\varepsilon_{1,2,2}}} = 1/3$ | 0 | $K = 1/3$ |
| $\tau_{\gamma_{\varepsilon_{2,1,1}}\gamma_{\varepsilon_{2,1,2}}} = 1/3$ | 0 | $K = 1/3$ | $\tau_{\gamma_{\varepsilon_{2,2,1}}\gamma_{\varepsilon_{2,3,2}}} = 1/3$ | 0 | $K = 1/3$ |
| $\tau_{\gamma_{\varepsilon_{3,1,1}}\gamma_{\varepsilon_{2,2,2}}} = 1/3$ | 0 | $K = 1/3$ | $\tau_{\gamma_{\varepsilon_{1,3,1}}\gamma_{\varepsilon_{2,3,2}}} = 1/3$ | 0 | $K = 1/3$ |

FIG. 16

EVENT CORRELATION

PRIORITY

This application is a Continuation of commonly assigned and co-pending U.S. patent application Ser. No. 14/203,036, filed Mar. 10, 2014, which is incorporated by reference in its entirety.

BACKGROUND

Enterprise environments typically generate log files to record a variety of activities. Sifting through the log file data sources to find errors and anomalies can be a daunting task, for example, due to the extensive volume of such log files. Log content analytics (LCA) is the application of analytics and semantic technologies to consume and analyze heterogeneous computer-generated log files to discover and extract relevant insights in a rationalized and structured form.

BRIEF DESCRIPTION OF DRAWINGS

Features of the present disclosure are illustrated by way of examples shown in the following figures. In the following figures, like numerals indicate like elements, in which:

FIG. 2 illustrates an event log of an authentication server, according to an example of the present disclosure;

FIG. 3 illustrates an event log of a network monitoring system, according to an example of the present disclosure;

FIG. 4 illustrates traces represented by line entry for a first log file $\theta_1$, according to an example of the present disclosure;

FIG. 5 illustrates traces represented by line entry for a second log file $\theta_2$, according to an example of the present disclosure;

FIG. 6 illustrates trace sequences from the first log file $\theta_1$, according to an example of the present disclosure;

FIG. 7 illustrates trace sequences from the second log file $\theta_2$, according to an example of the present disclosure;

FIG. 10 illustrates a feature set for events of the first log file $\theta_1$, according to an example of the present disclosure;

FIG. 11 illustrates a feature set for events of the second log file $\theta_2$, according to an example of the present disclosure;

FIG. 12 illustrates trace event pairs linkage strength determination for the first log file $\theta_1$ and the second log file $\theta_2$, according to an example of the present disclosure;

FIG. 13 illustrates trace event pairs time lapse determination for the first log file $\theta_1$ and the second log file $\theta_2$, according to an example of the present disclosure;

FIG. 14 illustrates trace event pairs link time strength determination for the first log file $\theta_1$ and the second log file $\theta_2$, according to an example of the present disclosure;

FIG. 15 illustrates trace event pairs link score determination for one event pairing for the first log file $\theta_1$ and the second log file $\theta_2$, according to an example of the present disclosure;

FIG. 16 illustrates determination of maximal set of trace event pairs link score values for the first log file $\theta_1$ and the second log file $\theta_2$, according to an example of the present disclosure;

DETAILED DESCRIPTION

Figure 1:
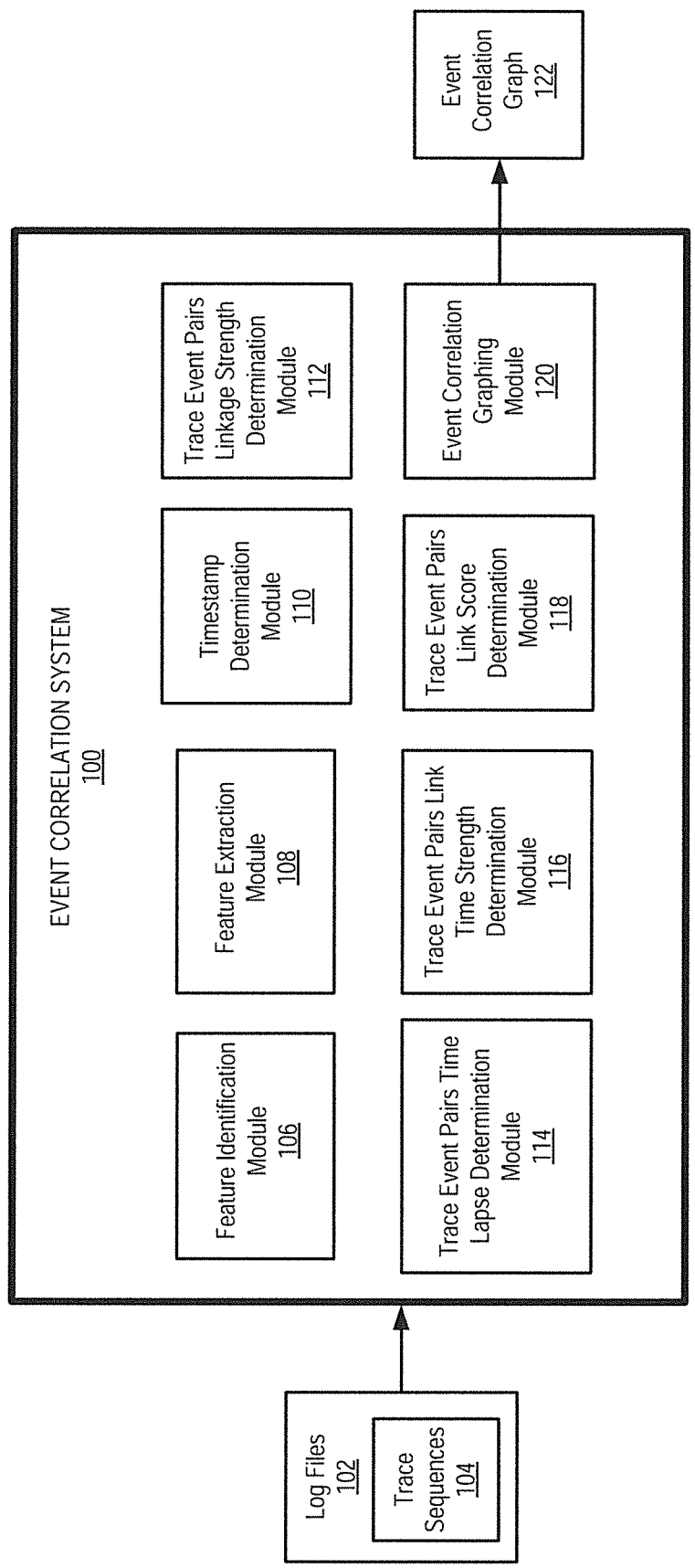
FIG. 1 illustrates a detailed architecture of an event correlation system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Data present in the contents of log files may be characterized by log traces with unique identifiers, timestamps, events, and actions. These attributes may be indicative of underlying behaviors of applications, the processes that may interact with applications, and the subsequent patterns that exist and may have been created by a series of events. Through mining and correlation, the information contained within log files may be modeled as a graph with statistics, event states, and transition probabilities between events. Learning the behavior of applications through log file traces and understanding the flow of events that occur within applications may facilitate performance of LCA, for example, with regard to an enterprise environment.

An event correlation system and a method for event correlation are disclosed herein, and may generally mine log files to generate a directed cyclic graph representing, for example, transitions between states, and probabilities of occurrences. The system and method disclosed herein may mine multiple log files at once, and differentiate the log files according to log file source. That is, the system and method disclosed herein may mine multiple log files with differing schemas, produce multiple log file model networks with one model per log file, and discover the existence of links across log files. When comparing log files to one another, the system and method disclosed herein may consider features (i.e., a feature set) of every event within every trace sequence, and compare the features against the events contained in trace sequences within another log file. The comparison feature set may include features such as, for example, identifiers, timestamps, event categories, originator information, destination information, and location information.

The system and method disclosed herein may generally generate the feature set for every event of interest in every dataset source. The system and method disclosed herein may also discover time of occurrence (i.e., a timestamp) for every event of interest in every dataset source. For every event of interest, a trace event pairs linkage strength metric may be determined between all events of differing data sources with feature overlap. For every event of interest, a trace event pairs time lapse metric may be determined between all events of differing data sources with feature overlap. For every event of interest, a trace event pairs link time strength metric may be determined between all events of differing data sources with feature overlap. Based on the trace event pairs linkage strength metric, the trace event pairs time lapse metric, and the trace event pairs link time strength metric, a trace event pairs link score metric set may be determined. The system and method disclosed herein may further determine a maximum trace event pairs link score metric set.

The system and method disclosed herein may generally provide for discovery of the existence of aberrations and other phenomena within log files as the aberrations and phenomena occur. The system and method disclosed herein may provide for extraction of correlations between trace events within log files and the information surrounding them such as probability of occurrence of trace log events, probability of transitions between particular trace log events, execution times of trace log events, and anomalous occurrences of trace log events. The system and method disclosed herein may provide information concerning how closely events across logs, graphs, or sources are related to each other. The system and method disclosed herein may also provide an intuitive and bounded value on the strength of the relationship between events, providing a quantitative value for the degree of fitness, and probability of occurrence related to events.

According to an example, an event correlation system is disclosed herein, and may include a processor, and a feature identification module that is executed by the processor to identify a feature set for each log file of a plurality of log files. A feature extraction module that is executed by the processor may extract the feature set for each event of a plurality of events in each log file of the plurality of log files. A trace event pairs linkage strength determination module that is executed by the processor may determine a plurality of trace event pairs linkage strength values for an event from a first log file of the plurality of log files and a plurality of events from a second log file of the plurality of log files. The plurality of trace event pairs linkage strength values may represent an overlap of the feature set for the event from the first log file and the feature set for each of the plurality of events from the second log file. Further, the trace event pairs linkage strength values may be based on an intersection of the feature set for the event from the first log file of the plurality of log files and the feature set for each of the plurality of events from the second log file of the plurality of log files, and a union of the feature set for the event from the first log file of the plurality of log files and the feature set for each of the plurality of events from the second log file of the plurality of log files.

The event correlation system disclosed herein may further include a timestamp determination module that is executed by the processor to determine a timestamp for each event of the plurality of events in each log file of the plurality of log files. A trace event pairs time lapse determination module that is executed by the processor may use the timestamps associated with the event from the first log file of the plurality of log files and the plurality of events from the second log file of the plurality of log files to determine a time difference between the event from the first log file of the plurality of log files and each of the plurality of events from the second log file of the plurality of log files.

The event correlation system disclosed herein may further include a trace event pairs link time strength determination module that is executed by the processor to determine trace event pairs link time strength values between the event from the first log file of the plurality of log files and each of the plurality of events from the second log file of the plurality of log files. The trace event pairs link time strength values may represent a strength of time difference between the event from the first log file of the plurality of log files and each of the plurality of events from the second log file of the plurality of log files. The trace event pairs link time strength values may be based on a time difference between the event from the first log file of the plurality of log files and each of the plurality of events from the second log file of the plurality of log files, and a highest absolute difference of all timestamp pairs between the event from the first log file of the plurality of log files and each of the plurality of events from the second log file of the plurality of log files. The trace event pairs link time strength values may be modified by application of a kernel function to scale the trace event pairs link time strength values.

The event correlation system disclosed herein may further include a trace event pairs link score determination module that is executed by the processor to determine trace event pairs link score values based on the trace event pairs linkage strength values and the trace event pairs link time strength values. The trace event pairs link score values may be based on a time difference between the event from the first log file of the plurality of log files and each of the plurality of events from the second log file of the plurality of log files, and a maximum trace event pairs linkage strength value between the event from the first log file of the plurality of log files and each of the plurality of events from the second log file of the plurality of log files. The trace event pairs link score determination module may further determine a maximum trace event pairs link score value that corresponds to a minimal time difference between the event from the first log file of the plurality of log files and each of the plurality of events from the second log file of the plurality of log files, and the maximum trace event pairs linkage strength value between the event from the first log file of the plurality of log files and each of the plurality of events from the second log file of the plurality of log files. Further, the trace event pairs link score determination module may determine a link that represents an event correlation between the event from the first log file of the plurality of log files and one of the plurality of events from the second log file of the plurality of log files based on the maximum trace event pairs link score value.

The event correlation system disclosed herein may further include an event correlation graphing module that is executed by the processor to display the link between the event from the first log file of the plurality of log files and one of the plurality of events from the second log file of the plurality of log files.

The system and method disclosed herein may provide for behavior characterization of events. The system and method disclosed herein may provide information concerning how closely events across logs, graphs, or sources are related to each other. For example, the system and method disclosed herein may provide for determination and discovery of aspects such as related events, complex behavior of events, root cause and effect, and relationships across heterogeneous datasets. The system and method disclosed herein may also provide an intuitive and bounded value on the strength of the relationship of events, quantitative values for the degree of fitness, and probability of occurrence of events. The system and method disclosed herein may also provide for detection related to events occurring in multiple data sources, detection of whether one event caused another event, detection of whether events are related transitionally, performance of root cause analysis, and discovery of relationships between events and quantification of such relationships. For the system and method disclosed herein, a dataset may include one or more schemas. Further, an event may include one or more features per event.

The system and method disclosed herein may be applicable in areas, such as, for example, audit or regulatory compliance, security policy compliance, digital forensic investigation, security incidence response, anomaly detection, error tracking, operational intelligence, application debugging, fraud, and/or in situations where there is a need for active intelligence as to the operational behavior of applications and events for which guidance on proactive measures are sought. The system and method disclosed herein may provide for the discovery of relationships across differing datasets and differing schemas. The system and method disclosed herein may provide for the inference of information such as temporal behaviors, state transitions, state correlations, and statistics associated with states and transitions. The system and method disclosed herein may provide for technical and economic scaling, for example, by performing mining operations in parallel, and by utilizing existing open source platforms. The system and method disclosed herein may provide a technology solution that can provide an intuitive and bounded strength metric with respect to event relationships across log files using features common to those events that are compared. Further, the system and method disclosed herein may provide a linkage between events within a sequence of events and correlate the strength of relationship using time as a mechanism to provide root cause analysis.

The system and method disclosed herein may apply trace mining techniques to discover the temporal relationships between log trace events. The system and method disclosed herein may discover the probability of event occurrences, and the probability of transitions between events. The system and method disclosed herein may detect and report anomalous states by analyzing the execution times of events, and cluster and group related events based on transition density. The system and method disclosed herein may provide the capability to understand behaviors and activities across log files and within a sequence of behaviors, and an intuitive bounded strength metric of the degree to which events across logs are related.

For the system and method disclosed herein, any output may be fed back for real-time processing or enrichment. The system and method disclosed herein may include a plug-in framework that has the capability to change backend connectors as the backend technology changes. The system and method disclosed herein may include a reusable framework that may be called and reused with no modification to the original source, but rather through an expansive configuration, thus requiring less expertise, and including a quicker turnaround time for change requests.

The system and method disclosed herein may discover correlations across log files by extracting a feature set for every event that occurs. The feature set of one event from one log file may be compared to the feature set of all events that are contained in another log, and a feature to feature similarity score (i.e., a trace event pairs linkage strength) may be determined. Events that have the shortest time elapsed between execution times may be favored by calculating a bounded metric (i.e., a trace event pairs link time strength metric, between 0 and 1) that represents how close event execution times are in relation to the overall set of execution times for that type of event. A bounded metric (i.e., a trace event pairs link score) may be provided by the system and method disclosed herein by combining the feature set similarity and the time elapse metric.

The system and method disclosed herein may provide for processing of logs and extraction of trace sequences for relatively large volumes of data. The system and method disclosed herein may provide for performance of extraction with parallel map-reduce processing, and the production of graph outputs of information that may be used to seed real-time analysis, anomaly detection, and discovery of root-cause analysis. The system and method disclosed herein may be capable of running locally, on a local hadoop cluster, or in the cloud with elastic scaling. The system and method disclosed herein may link trace events that occur in one source (e.g., log file) to trace events in another source for a definition for the strength of causality. The system and method disclosed herein may provide for training of an application to understand common and acceptable patterns, creation of a model of what an application understands as normal behavior, and matching of mined patterns against a known model.

The event correlation system and the method for event correlation disclosed herein provide a technical solution to technical problems related, for example, to anomaly detection in log file data. In many instances, anomaly detection in log file data can be a daunting task, for example, due to the extensive volume of such log files. The system and method disclosed herein provide the technical solution of identifying a feature set for each log file of a plurality of log files, and extracting the feature set for each event of a plurality of events in each log file of the plurality of log files. A plurality of trace event pairs linkage strength values may be determined for an event from a first log file of the plurality of log files and a plurality of events from a second log file of the plurality of log files. Timestamps for each event of the plurality of events in each log file of the plurality of log files may be used to determine a time difference between the event from the first log file of the plurality of log files and each of the plurality of events from the second log file of the plurality of log files. Trace event pairs link time strength values may be determined between the event from the first log file of the plurality of log files and each of the plurality of events from the second log file of the plurality of log files. Trace event pairs link score values may be determined based on the trace event pairs linkage strength values and the trace event pairs link time strength values. A maximum trace event pairs link score value that corresponds to a minimal time difference between the event from the first log file of the plurality of log files and each of the plurality of events from the second log file of the plurality of log files, and the maximum trace event pairs linkage strength value between the event from the first log file of the plurality of log files and each of the plurality of events from the second log file of the plurality of log files, may be determined. A link that represents an event correlation between the event from the first log file of the plurality of log files and one of the plurality of events from the second log file of the plurality of log files may be determined based on the maximum trace event pairs link score value.

FIG. 1 illustrates a detailed architecture of an event correlation system 100, according to an example of the present disclosure. The system 100 may receive log files 102 and their corresponding trace sequences 104. For example, the system 100 may receive a set of mined graphs from multiple log files 102 and their corresponding trace sequences 104. Each of the log files 102 may include one or more trace sequences. A feature identification module 106 may identify a feature set for each of the log files 102. A feature extraction module 108 may extract the feature set, for example, for events of the trace sequences 104. For example, the feature extraction module 108 may extract the feature set for each event in each of the trace sequences 104. The feature set may be extracted for each of the log files 102, and the feature set for a given log file may be maintained separately from the feature set for other log files. A timestamp determination module 110 may determine a corresponding set of timestamps for events of the trace sequences 104. As described in further detail, a trace event pairs linkage strength determination module 112 may determine a trace event pairs linkage strength metric between trace events of different log files 102. Alternatively, the trace event pairs linkage strength determination module 112 may determine a trace event pairs linkage strength metric between trace events of a single log file of the log files 102 to effectively determine a cross log trace event pairs linkage strength metric. Thus, the analysis described herein may be performed between trace sequences 104 of a single log file, or for trace sequences 104 of different log files 102. Using the set of timestamps for each event, a trace event pairs time lapse determination module 114 may determine the difference in time for each event pair that has a trace event pairs linkage strength value determined. Given an event in one log file and an event in another log file, a trace event pairs link time strength determination module 116 may determine the strength of time differences (i.e., a trace event pairs link time strength) between events in one log file and events in another log file. Given the timestamp difference between any pair of events across two of the log files 102, and the feature overlap of the same events, then a trace event pairs link score of their strength may be determined by a trace event pairs link score determination module 118. The trace event pairs link score determination module 118 may determine a new set that contains those time differences that are minimal while maintaining the correlation between the time differences and the corresponding event pairs. Further, the trace event pairs link score determination module 118 may determine a set of links between selective events by taking those maximal trace event pairs linkage strength values that have a corresponding event pair entry in the set of time differences. An event correlation graphing module 120 may generate an event correlation graph 122 based on an evaluation of the trace event pairs link score values.

As described herein, the modules and other elements of the event correlation system 100 may be machine readable instructions stored on a non-transitory computer readable medium. In addition, or alternatively, the modules and other elements of the event correlation system 100 may be hardware or a combination of machine readable instructions and hardware.

Referring to FIG. 1, the trace event pairs linkage strength determination module 112 is described. Given a trace sequence (e.g., trace sequence-1 from a first log file $\theta_1$) and another trace sequence (e.g., trace sequence-2 from a second log file $\theta_2$), the trace event pairs linkage strength determination module 112 may determine the trace event pairs linkage strength between events from separate trace sequences. The trace event pairs linkage strength may also be referred to as a trace event link feature strength. The trace event pairs linkage strength may be determined for all events, or for selective events of interest. For example, the trace event pairs linkage strength may be determined between two events from two separate trace sequences. For the trace event pairs linkage strength, generally, each event may include a feature set, and the greater the overlap of features, the stronger the event link. For example, the trace event pairs linkage strength determination module 112 may utilize the Jaccard Index to determine the trace event pairs linkage strength (i.e., $$\tau_{\gamma_{\varepsilon_{i,j,k}}, \gamma_{\varepsilon_{l,m,n}}})$$

between events from separate trace sequences as follows:

$$\tau_{\gamma_{\varepsilon_{i,j,k}}, \gamma_{\varepsilon_{l,m,n}}} = \frac{|\gamma_{\varepsilon_{i,j,k}} \cap \gamma_{\varepsilon_{l,m,n}}|}{|\gamma_{\varepsilon_{i,j,k}} \cup \gamma_{\varepsilon_{l,m,n}}|} \quad \text{Equation (1)}$$

For Equation (1), $\varepsilon_i \in \varepsilon_j$ and $\varepsilon_j \in \theta_k$, and $\varepsilon_i$ may represent the $i^{th}$ event in the set of events $\varepsilon_j$ from the $j^{th}$ trace sequence mined from, and an element of the $k^{th}$ log file (with $\theta$ representing a general log file), which in turn may be represented by $\varepsilon_{i,j,k}$ (similarly for $\varepsilon_{l,m,n}$). Further, $\gamma$ may represent the feature set for a given event.

The event correlation system 100 may also account for the time of occurrence of an event within a trace sequence in one log file compared to that of another event in a trace sequence in another log file. The event correlation system 100 may scale the metric related to time of occurrence as a representation of how closely related events are. That is, the further away in time two events occur, the less likely they are related and vice versa. As a result, the event correlation system 100 may consider those trace event pairs $$(\tau_{\gamma_{\varepsilon_{i,j,k}}, \gamma_{\varepsilon_{l,m,n}}})$$

with a minimal time distance between them. The time between events may be weighted as follows.

Given an event in one log file and an event in another log file, the trace event pairs time lapse determination module 114 may determine the time difference between the event in one log file and the event in another log file as follows:

$$\Delta_{\varepsilon_{l,m,n}, \varepsilon_{i,j,k}} = |\alpha_{\varepsilon_{l,m,n}} - \alpha_{\varepsilon_{i,j,k}}| \quad \text{Equation (2)}$$

For Equation (2), $\alpha_{\varepsilon_{l,m,n}}$ may represent the time of occurrence of the $l^{th}$ event from the $m^{th}$ trace sequence mined from, and an element of $n^{th}$ log file (similarly for i, j, k). According to an example, given events in one log file and events in another log file, the trace event pairs time lapse determination module 114 may determine the time differences between all events in one log file and all events in another log file.

Given an event in one log file and an event in another log file, the trace event pairs link time strength determination module 116 may determine the strength of time differences (i.e., the trace event pairs link time strength) between the event in one log file and the event in another log file as follows:

$$\kappa = \frac{\Delta_{\varepsilon_{l,m,n}, \varepsilon_{i,j,k}}}{\Delta_H} \quad \text{Equation (3)}$$

For Equation (3), $\Delta_{\varepsilon_{l,m,n}, \varepsilon_{i,j,k}}$ may represent the absolute value of the difference of timestamps for $\varepsilon_{i,j,k}$ and $\varepsilon_{l,m,n}$, $\Delta_H$ may represent the highest absolute difference of any timestamp pair, and $\Delta_H$ and $\Delta_{\varepsilon_{l,m,n},\varepsilon_{i,j,k}}$ are both elements from the set of trace event pairs time lapse values determined by the trace event pairs time lapse determination module 114 between one event in one log file and all events in another log file. With respect to the trace event pairs link time strength, generally, the closer two events occur in time, the stronger their linkage.

Once the trace event pairs link time strength is determined by the trace event pairs link time strength determination module 116, the trace event pairs link time strength may be modified, for example, by application of a kernel, to produce a value between 0 and 1 for use as a scalar when applied to the previously captured metric (i.e., the trace event pairs linkage strength of Equation (1)). The kernel may be determined as follows:

$$k_t(x) = 1 - |x| \quad \text{Equation (4)}$$

Final scoring for a link may be obtained by using both the trace event pairs linkage strength of Equation (1) and the trace event pairs link time strength of Equation (3) to produce a final score.

Given the timestamp difference between any pair of events across two of the log files 102, and the feature overlap of the same events (i.e., the trace event pairs linkage strength), the trace event pairs link score of their strength may be determined by the trace event pairs link score determination module 118 as follows:

$$K = \tau_{\gamma_{\varepsilon_{i,j,k}}, \gamma_{\varepsilon_{l,m,n}}} \cdot k_t(\kappa) \quad \text{Equation (5)}$$

For Equation (5), $$\tau_{\gamma_{\varepsilon_{i,j,k}}, \gamma_{\varepsilon_{l,m,n}}}$$

represents the trace event pairs linkage strength of Equation (1), $\kappa$ represents the trace event pairs link time strength of Equation (3), and $k_t(\ )$ represents the kernel function of Equation (4). Once the set of the minimal time differences for an event pairing is found, the remaining maximal trace event pairs linkage strengths may be applied to implement the trace event pairs link score. Based on the trace event pairs link score determination, the maximal set of trace event pairs link score values may be determined. The trace event pairs linkage strength pairs with the maximum trace event pairs link score values may represent the links that hold between data sources (e.g., the first log file $\theta_1$ and the second log file $\theta_2$) for those trace event pairs linkage strengths that were a maximum of their respective sets. With respect to the trace event pairs link score, generally, the trace event pairs link score may represent an aggregation of all known information that represents how strong a relationship is that exists between two discovered events.

Referring to FIGS. 1-17, an example of an application of the event correlation system 100 is described.

FIG. 2 illustrates an event log of an authentication server, and FIG. 3 illustrates an event log of a network monitoring system, according to an example of the present disclosure. The event log of the authentication server of FIG. 2 may include, for example, user login events (e.g., a virtual private network (VPN) server log). The event log of a network monitoring system of FIG. 3 may include, for example, resource utilization events (e.g., a router network bandwidth monitoring system). The example of FIGS. 2 and 3 may represent a situation where every time a particular user logs into a corporate network, there is an increase in the amount of data being transferred across an independent router located across the network. The VPN server may record an event in its log that this user has logged into the corporate network from a particular location at a particular timestamp. At approximately the same time as the login event, the networking monitoring application may record an anomalous event in its log showing a large data transfer occurring between a corporate asset and an external system with the same location as the user from the VPN server event. In such a situation, an administrator managing the VPN server may view all the successful and failed login events for all the users. Similarly, a network administrator may view all anomalies that have occurred on the router. However, neither administrator may have a consolidated view of all the events across the two systems that may indicate a correlation between a particular user login and the occurrence of an anomaly. The example of FIGS. 2-17 may illustrate an application on such two disparate system logs to detect that there is a strong correlation between the two events given that they both occurred at around the same time and also have the same location feature.

Given two log files $\theta_1$ and $\theta_2$ of the log files 102 related to the event logs of FIGS. 2 and 3, the contents of each of the log files $\theta_1$ and $\theta_2$ may be respectively illustrated in FIGS. 4 and 5. For example, FIG. 4 illustrates traces represented by line entry for a first log file $\theta_1$, and FIG. 5 illustrates traces represented by line entry for a second log file $\theta_2$, according to an example of the present disclosure.

The corresponding trace sequences from each log file may be mined and determined, respectively, as shown in FIGS. 6 and 7. For example, FIG. 6 illustrates trace sequences from the first log file $\theta_1$, and FIG. 7 illustrates trace sequences from the second log file $\theta_2$, according to an example of the present disclosure. The discovery of trace sequences may allow for subsequent associations between events in the context of complicated behavioral patterns.

Figure 8:
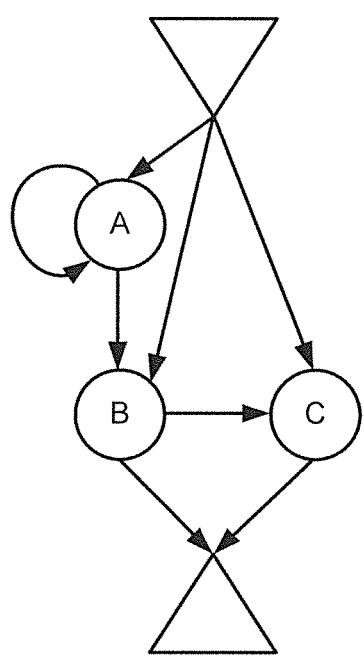
FIG. 8 illustrates a graphic representation of the first log file $\theta_1$, according to an example of the present disclosure.
Figure 9:
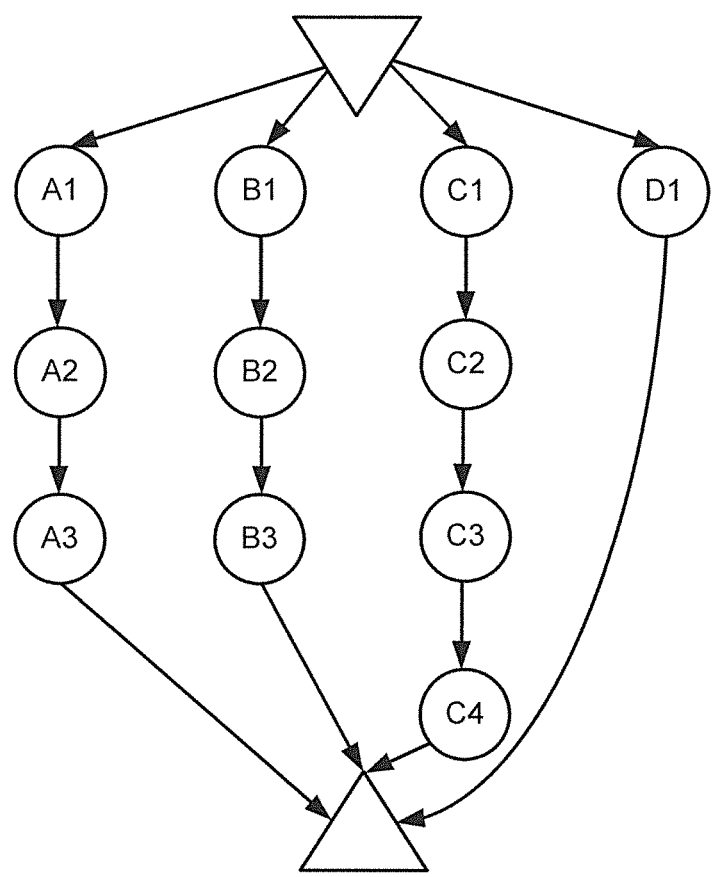
FIG. 9 illustrates a graphic representation of the second log file $\theta_2$, according to an example of the present disclosure.

FIG. 8 illustrates a graphic representation of the first log file $\theta_1$, and FIG. 9 illustrates a graphic representation of the second log file $\theta_2$, according to an example of the present disclosure.

The feature extraction module 108 may extract the identified feature set from all of the available information for each event in each trace, excluding time as a feature in the initial set construction. For example, the feature extraction module 108 may extract the feature set for each event in each of the trace sequences 104 of FIGS. 6 and 7. Other information may be included in the feature set for an event. However, for the example of FIGS. 10 and 11, a minimally relevant feature set is described. The feature set of FIGS. 10 and 11 may include features that include, for example, identifier and event type. FIG. 10 illustrates a feature set for events of the first log file $\theta_1$, and FIG. 11 illustrates a feature set for events of the second log file $\theta_2$, according to an example of the present disclosure.

Once the feature sets are generated for each of the trace sequence 104 of the log files 102, the trace event pairs linkage strength determination module 112 may determine the trace event pairs linkage strength between events from separate trace sequences using Equation (1). FIG. 12 illustrates trace event pairs linkage strength determination for the first log file $\theta_1$ and the second log file $\theta_2$, according to an example of the present disclosure.

Given events in one log file and events in another log file, the trace event pairs time lapse determination module 114 may determine the time differences between the events in one log file and the events in another log file using Equation (2). FIG. 13 illustrates trace event pairs time lapse determination for the first log file $\theta_1$ and the second log file $\theta_2$, according to an example of the present disclosure.

Given an event in one log file and an event in another log file, the trace event pairs link time strength determination module 116 may determine the strength of time differences (i.e., the trace event pairs link time strength) between the event in one log file and the event in another log file using Equation (3). FIG. 14 illustrates trace event pairs link time strength determination for the first log file $\theta_1$ and the second log file $\theta_2$, according to an example of the present disclosure.

Given the timestamp difference between any pair of events across two of the log files 102, and the feature overlap of the same events, then the trace event pairs link score of their strength may be determined by the trace event pairs link score determination module 118 using Equation (5). FIG. 15 illustrates trace event pairs link score determination for one event pairing for the first log file $\theta_1$ and the second log file $\theta_2$, according to an example of the present disclosure. For the example of FIG. 15, the determination of the trace event pairs link score for one event pairing overlap demonstrates that events with the strongest linking pairing will have the highest event link score and generally the lowest time difference that occurs between them (i.e., $\varepsilon_{1,1,1}$, $\varepsilon_{1,1,2}$).

FIG. 16 illustrates determination of a maximal set of trace event pairs link score values for the first log file $\theta_1$ and the second log file $\theta_2$, according to an example of the present disclosure. Specifically, FIG. 16 illustrates the remaining trace event pairs linkage strength pairs with the maximum trace event pairs link score values being the links that hold between the first log file $\theta_1$ and the second log file $\theta_2$ for those trace event pairs linkage strength values that were a maximum of their respective sets.

Figure 17:
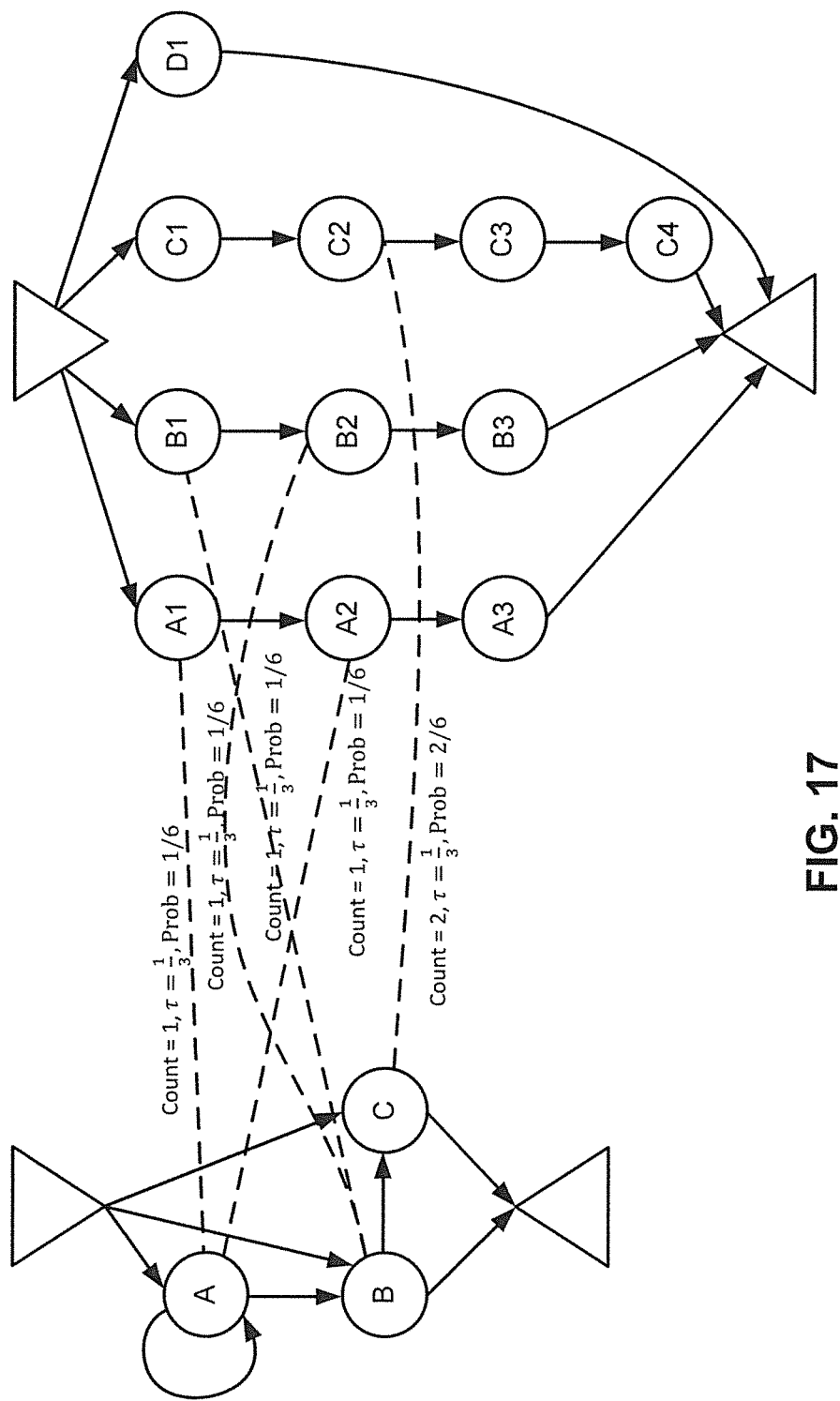
FIG. 17 illustrates event correlation for the first log file $\theta_1$ and the second log file $\theta_2$, according to an example of the present disclosure.

FIG. 17 illustrates event correlation for the first log file $\theta_1$ and the second log file $\theta_2$, according to an example of the present disclosure. FIG. 17 graphically illustrates the remaining trace event pairs linkage strength pairs with the maximum trace event pairs link score values being the links that hold between the first log file $\theta_1$ and the second log file $\theta_2$ for those trace event pairs linkage strength values that were a maximum of their respective sets. For example, FIG. 17 illustrates the event correlation graph 122 generated by the event correlation graphing module 120 based on an evaluation of the trace event pairs link score values. As shown in FIG. 17, based on the trace event pairs linkage strength values, events A and A1 may include a transition probability of ⅙, events A and A2 may include a transition probability of ⅙, events B and B1 may include a transition probability of ⅙, events B and B2 may include a transition probability of ⅙, and events C and C2 may include a transition probability of ⅖.

Figure 18:
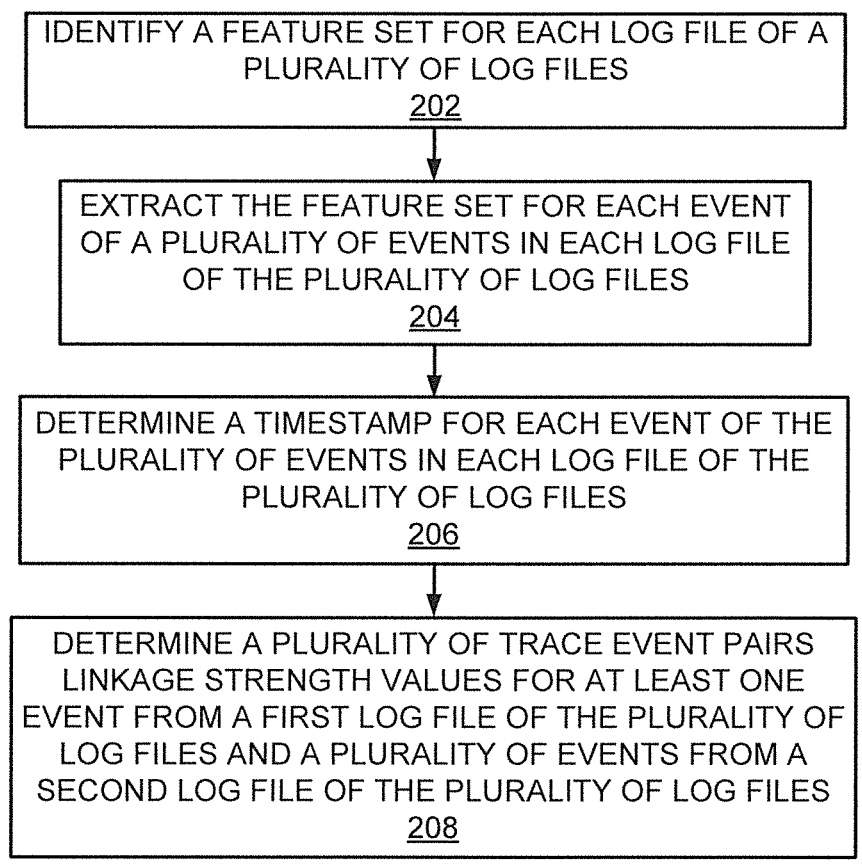
FIG. 18 illustrates a method for event correlation, according to an example of the present disclosure.

FIG. 18 illustrates a flowchart of a method 200 for event correlation, according to an example. The method 200 may be implemented on the event correlation system 100 described above with reference to FIGS. 1-17 by way of example and not limitation. The method 200 may be practiced in other systems.

Referring to FIGS. 1 and 18, at block 202, the method 200 may include identifying a feature set for each log file of a plurality of log files. For example, as shown in FIG. 1, the feature identification module 106 may identify a feature set for each log file of the log files 102.

At block 204, the method 200 may include extracting the feature set for each event of a plurality of events in each log file of the plurality of log files. For example, as shown in FIG. 1, the feature extraction module 108 may extract the feature set for each event of a plurality of events in each log file of the log files 102.

At block 206, the method 200 may include determining a timestamp for each event of the plurality of events in each log file of the plurality of log files. For example, as shown in FIG. 1, the timestamp determination module 110 may determine a timestamp for each event of the plurality of events in each log file of the log files 102.

At block 208, the method 200 may include determining a plurality of trace event pairs linkage strength values for at least one event from a first log file of the plurality of log files and a plurality of events from a second log file of the plurality of log files. For example, as shown in FIG. 1, the trace event pairs linkage strength determination module 112 may determine a plurality of trace event pairs linkage strength values for at least one event from a first log file of the log files 102 and a plurality of events from a second log file of the log files 102. The plurality of trace event pairs linkage strength values may represent an overlap of the feature set for the at least one event from the first log file and the feature set for each of the plurality of events from the second log file. Further, as discussed herein with reference to Equation (1), the trace event pairs linkage strength values may be based on an intersection of the feature set for the at least one event from the first log file of the log files 102 and the feature set for each of the plurality of events from the second log file of the log files 102, and a union of the feature set for the at least one event from the first log file of the log files 102 and the feature set for each of the plurality of events from the second log file of the log files 102.

According to an example, the method 200 may further include using the timestamps associated with the at least one event from the first log file of the plurality of log files and the plurality of events from the second log file of the plurality of log files to determine a time difference between the at least one event from the first log file of the plurality of log files and each of the plurality of events from the second log file of the plurality of log files. For example, as discussed herein with reference to Equation (2), the timestamps associated with the at least one event from the first log file of the log files 102 and the plurality of events from the second log file of the log files 102 may be used to determine a time difference between the at least one event from the first log file of the log files 102 and each of the plurality of events from the second log file of the log files 102.

According to an example, the method 200 may further include determining trace event pairs link time strength values between the at least one event from the first log file of the plurality of log files and each of the plurality of events from the second log file of the plurality of log files. For example, as shown in FIG. 1, the trace event pairs link time strength determination module 116 may determine trace event pairs link time strength values between the at least one event from the first log file of the log files 102 and each of the plurality of events from the second log file of the log files 102. The trace event pairs link time strength values may represent a strength of time difference between the at least one event from the first log file of the plurality of log files and each of the plurality of events from the second log file of the plurality of log files. Further, as discussed herein with reference to Equation (3), the trace event pairs link time strength values may be based on a time difference between the at least one event from the first log file of the plurality of log files and each of the plurality of events from the second log file of the plurality of log files, and a highest absolute difference of all timestamp pairs between the at least one event from the first log file of the plurality of log files and each of the plurality of events from the second log file of the plurality of log files.

According to an example, the method 200 may further include determining trace event pairs link score values based on the trace event pairs linkage strength values and the trace event pairs link time strength values. For example, as shown in FIG. 1, the trace event pairs link score determination module 118 may determine trace event pairs link score values based on the trace event pairs linkage strength values and the trace event pairs link time strength values. As discussed herein with reference to Equation (5), the trace event pairs link score values may be based on a time difference between the at least one event from the first log file of the plurality of log files and each of the plurality of events from the second log file of the plurality of log files, and a maximum trace event pairs linkage strength value between the at least one event from the first log file of the plurality of log files and each of the plurality of events from the second log file of the plurality of log files.

According to an example, the method 200 may further include determining a maximum trace event pairs link score value that corresponds to a minimal time difference between the at least one event from the first log file of the plurality of log files and each of the plurality of events from the second log file of the plurality of log files, and the maximum trace event pairs linkage strength value between the at least one event from the first log file of the plurality of log files and each of the plurality of events from the second log file of the plurality of log files. For example, as shown in FIG. 1, the trace event pairs link score determination module 118 may determine the maximum trace event pairs link score value.

According to an example, the method 200 may further include determining at least one link that represents an event correlation between the at least one event from the first log file of the plurality of log files and at least one of the plurality of events from the second log file of the plurality of log files based on the maximum trace event pairs link score value. For example, as shown in FIG. 1, the trace event pairs link score determination module 118 may determine at least one link that represents an event correlation between the at least one event from the first log file of the log files 102 and at least one of the plurality of events from the second log file of the log files 102 based on the maximum trace event pairs link score value.

According to an example, the method 200 may further include displaying the at least one link between the at least one event from the first log file of the plurality of log files and the at least one of the plurality of events from the second log file of the plurality of log files. For example, as shown in FIG. 1, the event correlation graphing module 120 may display the at least one link between the at least one event from the first log file of the log files 102 and the at least one of the plurality of events from the second log file of the log files 102.

Figure 19:
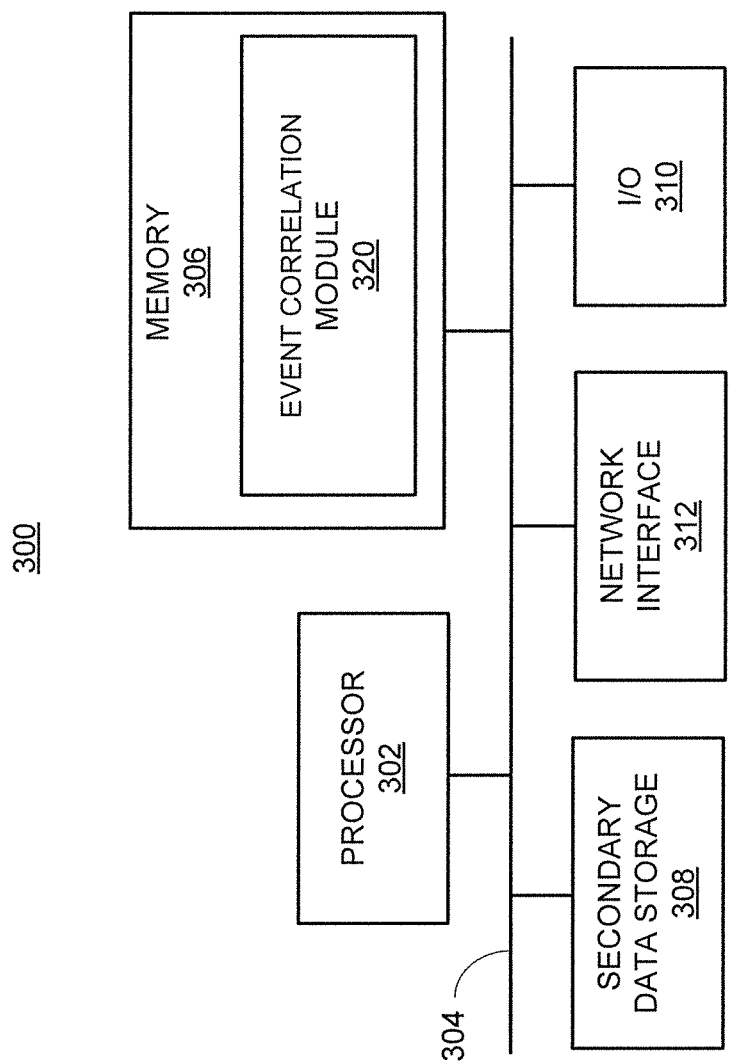
FIG. 19 illustrates a computer system, according to an example of the present disclosure.

FIG. 19 shows a computer system 300 that may be used with the examples described herein. The computer system may represent a generic platform that includes components that may be in a server or another computer system. The computer system 300 may be used as a platform for the system 100. The computer system 300 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 300 may include a processor 302 that may implement or execute machine readable instructions performing some or all of the methods, functions and other processes described herein. Commands and data from the processor 302 may be communicated over a communication bus 304. The computer system may also include a main memory 306, such as a random access memory (RAM), where the machine readable instructions and data for the processor 302 may reside during runtime, and a secondary data storage 308, which may be non-volatile and stores machine readable instructions and data. The memory and data storage are examples of computer readable mediums. The memory 306 may include an event correlation module 320 including machine readable instructions residing in the memory 306 during runtime and executed by the processor 302. The event correlation module 320 may include the modules of the system 100 shown in FIG. 1.

The computer system 300 may include an I/O device 310, such as a keyboard, a mouse, a display, etc. The computer system may include a network interface 312 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An event correlation system comprising:
   at least one processor;
   a non-transitory computer readable medium storing machine readable instructions that when executed by the at least one processor cause the at least one processor to:
   identify a feature set for each log file of a plurality of log files;
   extract the feature set for each event of a plurality of events in each log file of the plurality of log files;
   determine a timestamp for each event of the plurality of events in each log file of the plurality of log files;
   determine a plurality of trace event pairs linkage strength values for at least one event from a first log file of the plurality of log files and a plurality of events from a second log file of the plurality of log files, wherein
   the plurality of trace event pairs linkage strength values represent an overlap of the feature set for the at least one event from the first log file and the feature set for each of the plurality of events from the second log file;
   determine trace event pairs link time strength values between the at least one event from the first log file of the plurality of log files and each of the plurality of events from the second log file of the plurality of log files, wherein the trace event pairs link time strength values represent a strength of time difference between the at least one event from the first log file of the plurality of log files and each of the plurality of events from the second log file of the plurality of log files; and determine trace event pairs link score values based on $$K = \tau_{\gamma_{\varepsilon_{i,j,k}},\gamma_{\varepsilon_{l,m,n}}} \cdot k_t(\kappa)$$

that specifies multiplication of the trace event pairs linkage strength values as $$\tau_{\gamma_{\varepsilon_{i,j,k}},\gamma_{\varepsilon_{l,m,n}}}$$

and the trace event pairs link time strength values as κ, wherein $$\tau_{\gamma_{\varepsilon_{i,j,k}},\gamma_{\varepsilon_{l,m,n}}} = \frac{|\gamma_{\varepsilon_{i,j,k}} \cap \gamma_{\varepsilon_{l,m,n}}|}{|\gamma_{\varepsilon_{i,j,k}} \cup \gamma_{\varepsilon_{l,m,n}}|} \qquad \text{Equation (1)}$$

such that $\varepsilon_i$ represents an $i^{th}$ event in a set of events $\varepsilon_j$ from a $j^{th}$ trace sequence mined from and an element of a $k^{th}$ log file, $\varepsilon_l$ represents an $l^{th}$ event in a set of events $\varepsilon_l$ from an $m^{th}$ trace sequence mined from and an element of an $n^h$ log file, and γ represents a given event feature set, and wherein the trace event pairs link score values are based on a time difference between the at least one event from the first log file of the plurality of log files and each of the plurality of events from the second log file of the plurality of log files, and a maximum trace event pairs linkage strength value between the at least one event from the first log file of the plurality of log files and each of the plurality of events from the second log file of the plurality of log files,
wherein
the trace event pairs link time strength values are based on the time difference between the at least one event from the first log file of the plurality of log files and each of the plurality of events from the second log file of the plurality of log files, and a highest absolute difference of all timestamp pairs between the at least one event from the first log file of the plurality of log files and each of the plurality of events from the second log file of the plurality of log files,
an event correlation between the at least one event from the first log file of the plurality of log files and at least one event of the plurality of events from the second log file of the plurality of log files is identified based on the plurality of trace event pairs linkage strength values, the trace event pairs link time strength values, and the trace event pairs link score values,
the at least one event of the plurality of events from the second log file of the plurality of log files represents an anomaly associated with the second log file of the plurality of log files, and the anomaly associated with the second log file of the plurality of log files is related to the at least one event from the first log file of the plurality of log files.

2. The event correlation system according to claim 1, wherein the instructions are further to cause the at least one processor to:
use the timestamps associated with the at least one event from the first log file of the plurality of log files and the plurality of events from the second log file of the plurality of log files to determine the time difference between the at least one event from the first log file of the plurality of log files and each of the plurality of events from the second log file of the plurality of log files.

3. The event correlation system according to claim 1, wherein the trace event pairs link time strength values are modified by application of a kernel function to scale the trace event pairs link time strength values.

4. The event correlation system according to claim 1, wherein the instructions are further to cause the at least one processor to:
determine a maximum trace event pairs link score value that corresponds to a minimal time difference between the at least one event from the first log file of the plurality of log files and each of the plurality of events from the second log file of the plurality of log files, and the maximum trace event pairs linkage strength value between the at least one event from the first log file of the plurality of log files and each of the plurality of events from the second log file of the plurality of log files.

5. The event correlation system according to claim 4, wherein the instructions are further to cause the at least one processor to:
determine at least one link that represents the event correlation between the at least one event from the first log file of the plurality of log files and the at least one event of the plurality of events from the second log file of the plurality of log files based on the maximum trace event pairs link score value.

6. The event correlation system according to claim 5, wherein the instructions are further to cause the at least one processor to:
display the at least one link between the at least one event from the first log file of the plurality of log files and the at least one event of the plurality of events from the second log file of the plurality of log files.

7. The event correlation system according to claim 1, wherein the feature set includes at least one feature related to an identifier, a timestamp, an event category, originator information, destination information, and location information.

8. A method for event correlation, the method comprising:
identifying, by at least one processor, a feature set for each log file of a plurality of log files;
extracting, by the at least one processor, the feature set for each event of a plurality of events in each log file of the plurality of log files;
determining, by the at least one processor, a timestamp for each event of the plurality of events in each log file of the plurality of log files;
determining, by the at least one processor, a plurality of trace event pairs linkage strength values for at least one event from a first log file of the plurality of log files and a plurality of events from a second log file of the plurality of log files, wherein the plurality of trace event pairs linkage strength values represent an overlap of the feature set for the at least one event from the first log file and the feature set for each of the plurality of events from the second log file;

determining, by the at least one processor, trace event pairs link time strength values between the at least one event from the first log file of the plurality of log files and each of the plurality of events from the second log file of the plurality of log files, wherein the trace event pairs link time strength values represent a strength of time difference between the at least one event from the first log file of the plurality of log files and each of the plurality of events from the second log file of the plurality of log files; and determining, by the at least one processor, trace event pairs link score values based on $$K = \tau_{\gamma_{\varepsilon_{i,j,k}}, \gamma_{\varepsilon_{l,m,n}}} \cdot k_t(\kappa)$$

that specifies multiplication of the trace event pairs linkage strength values as $$\tau_{\gamma_{\varepsilon_{i,j,k}}, \gamma_{\varepsilon_{l,m,n}}}$$

and the trace event pairs link time strength values as κ, wherein $$\tau_{\gamma_{\varepsilon_{i,j,k}}, \gamma_{\varepsilon_{l,m,n}}} = \frac{|\gamma_{\varepsilon_{i,j,k}} \cap \gamma_{\varepsilon_{l,m,n}}|}{|\gamma_{\varepsilon_{i,j,k}} \cup \gamma_{\varepsilon_{l,m,n}}|} \quad \text{Equation (1)}$$

such that $\varepsilon_i$ represents an $i^{th}$ event in a set of events $\varepsilon_j$ from a $j^{th}$ trace sequence mined from and an element of a $k^{th}$ log file, $\varepsilon_l$ represents an $l^{th}$ event in a set of events $\varepsilon_j$ from an $m^{th}$ trace sequence mined from and an element of an $n^h$ log file, and γ represents a given event feature set, and wherein the trace event pairs link score values are based on a time difference between the at least one event from the first log file of the plurality of log files and each of the plurality of events from the second log file of the plurality of log files, and a maximum trace event pairs linkage strength value between the at least one event from the first log file of the plurality of log files and each of the plurality of events from the second log file of the plurality of log files, wherein
the trace event pairs link time strength values are based on the time difference between the at least one event from the first log file of the plurality of log files and each of the plurality of events from the second log file of the plurality of log files, and a highest absolute difference of all timestamp pairs between the at least one event from the first log file of the plurality of log files and each of the plurality of events from the second log file of the plurality of log files, an event correlation between the at least one event from the first log file of the plurality of log files and at least one event of the plurality of events from the second log file of the plurality of log files is identified based on the plurality of trace event pairs linkage strength values, the trace event pairs link time strength values, and the trace event pairs link score values, the at least one event of the plurality of events from the second log file of the plurality of log files represents an anomaly associated with the second log file of the plurality of log files, and the anomaly associated with the second log file of the plurality of log files is related to the at least one event from the first log file of the plurality of log files.

9. The method according to claim 8, further comprising:
scaling the trace event pairs link time strength values by applying a kernel function.

10. The method according to claim 8, further comprising:
determining, by the at least one processor, a maximum trace event pairs link score value that corresponds to a minimal time difference between the at least one event from the first log file of the plurality of log files and each of the plurality of events from the second log file of the plurality of log files, and the maximum trace event pairs linkage strength value between the at least one event from the first log file of the plurality of log files and each of the plurality of events from the second log file of the plurality of log files.

11. The method according to claim 10, further comprising:
determining, by the at least one processor, at least one link that represents the event correlation between the at least one event from the first log file of the plurality of log files and the at least one event of the plurality of events from the second log file of the plurality of log files based on the maximum trace event pairs link score value.

12. The method according to claim 11, further comprising:
generating, by the at least one processor, a display of the at least one link between the at least one event from the first log file of the plurality of log files and the at least one event of the plurality of events from the second log file of the plurality of log files.

13. The method according to claim 8, further comprising:
using, by the at least one processor, the timestamps associated with the at least one event from the first log file of the plurality of log files and the plurality of events from the second log file of the plurality of log files to determine the time difference between the at least one event from the first log file of the plurality of log files and each of the plurality of events from the second log file of the plurality of log files.

14. The method according to claim 8, further comprising:
modifying, by the at least one processor, the trace event pairs link time strength values by application of a kernel function to scale the trace event pairs link time strength values.

15. The method according to claim 8, wherein the feature set includes at least one feature related to an identifier, a timestamp, an event category, originator information, destination information, and location information.

16. A non-transitory computer readable medium having stored thereon machine readable instructions for event correlation, the machine readable instructions when executed cause at least one processor to:
identify a feature set for each log file of a plurality of log files;
extract the feature set for each event of a plurality of events in each log file of the plurality of log files;
determine a timestamp for each event of the plurality of events in each log file of the plurality of log files;
determine a plurality of trace event pairs linkage strength values for at least one event from a first log file of the plurality of log files and a plurality of events from a second log file of the plurality of log files, wherein
the plurality of trace event pairs linkage strength values represent an overlap of the feature set for the at least one event from the first log file and the feature set for each of the plurality of events from the second log file;

determine trace event pairs link time strength values between the at least one event from the first log file of the plurality of log files and each of the plurality of events from the second log file of the plurality of log files, wherein the trace event pairs link time strength values represent a strength of time difference between the at least one event from the first log file of the plurality of log files and each of the plurality of events from the second log file of the plurality of log files; and determine trace event pairs link score values based on $$K = \tau_{\gamma_{\varepsilon_{i,j,k}}, \gamma_{\varepsilon_{l,m,n}}} \cdot k_t(\kappa)$$

that specifies multiplication of the trace event pairs linkage strength values as $$\tau_{\gamma_{\varepsilon_{i,j,k}}, \gamma_{\varepsilon_{l,m,n}}}$$

and the trace event pairs link time strength values as κ, wherein $$\tau_{\gamma_{\varepsilon_{i,j,k}}, \gamma_{\varepsilon_{l,m,n}}} = \frac{|\gamma_{\varepsilon_{i,j,k}} \cap \gamma_{\varepsilon_{l,m,n}}|}{|\gamma_{\varepsilon_{i,j,k}} \cup \gamma_{\varepsilon_{l,m,n}}|} \quad \text{Equation (1)}$$

such that $\varepsilon_i$ represents an $i^{th}$ event in a set of events $\varepsilon_j$ from a $j^{th}$ trace sequence mined from and an element of a $k^{th}$ log file, $\varepsilon_l$ represents an $l^{th}$ event in a set of events $\varepsilon_j$ from an $m^{th}$ trace sequence mined from and an element of an $n^h$ log file, and γ represents a given event feature set, and wherein the trace event pairs link score values are based on a time difference between the at least one event from the first log file of the plurality of log files and each of the plurality of events from the second log file of the plurality of log files, and a maximum trace event pairs linkage strength value between the at least one event from the first log file of the plurality of log files and each of the plurality of events from the second log file of the plurality of log files, wherein the trace event pairs link time strength values are based on the time difference between the at least one event from the first log file of the plurality of log files and each of the plurality of events from the second log file of the plurality of log files, and a highest absolute difference of all timestamp pairs between the at least one event from the first log file of the plurality of log files and each of the plurality of events from the second log file of the plurality of log files, an event correlation between the at least one event from the first log file of the plurality of log files and at least one event of the plurality of events from the second log file of the plurality of log files is identified based on the plurality of trace event pairs linkage strength values, the trace event pairs link time strength values, and the trace event pairs link score values, the at least one event of the plurality of events from the second log file of the plurality of log files represents an anomaly associated with the second log file of the plurality of log files, and the anomaly associated with the second log file of the plurality of log files is related to the at least one event from the first log file of the plurality of log files.

17. The non-transitory computer readable medium according to claim 16, wherein the machine readable instructions when executed further cause the at least one processor to:

use the timestamps associated with the at least one event from the first log file of the plurality of log files and the plurality of events from the second log file of the plurality of log files to determine the time difference between the at least one event from the first log file of the plurality of log files and each of the plurality of events from the second log file of the plurality of log files.

18. The non-transitory computer readable medium according to claim 16, wherein the machine readable instructions when executed further cause the at least one processor to:

determine at least one link that represents the event correlation between the at least one event from the first log file of the plurality of log files and the at least one event of the plurality of events from the second log file of the plurality of log files based on a maximum trace event pairs link score value.

19. The non-transitory computer readable medium according to claim 18, wherein the machine readable instructions when executed further cause the at least one processor to:

display the at least one link between the at least one event from the first log file of the plurality of log files and the at least one event of the plurality of events from the second log file of the plurality of log files.

20. The non-transitory computer readable medium according to claim 16, wherein the machine readable instructions when executed further cause the at least one processor to:

scale the trace event pairs link time strength values by applying a kernel function.

* * * * *